Oct. 25, 1932.  C. G. SWART  1,884,371
LENS HOLDER FOR SPECTACLE AND EYEGLASS FRAMES
Filed Oct. 20, 1930  2 Sheets-Sheet 1
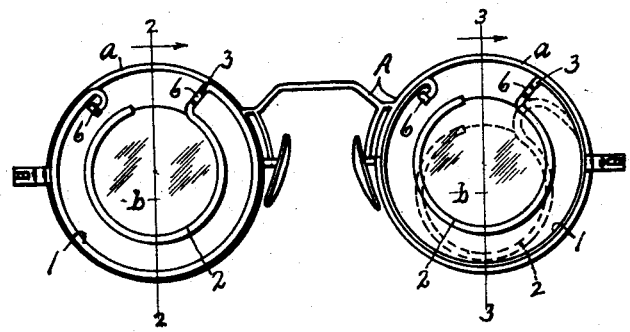
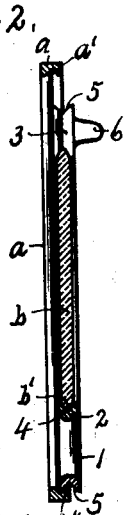
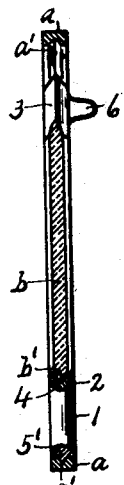
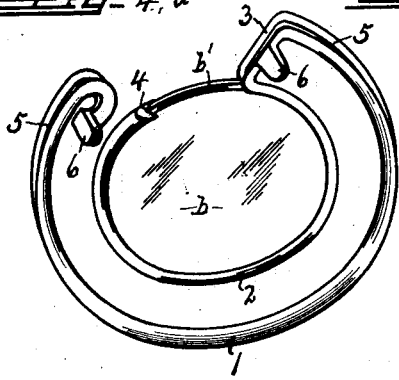
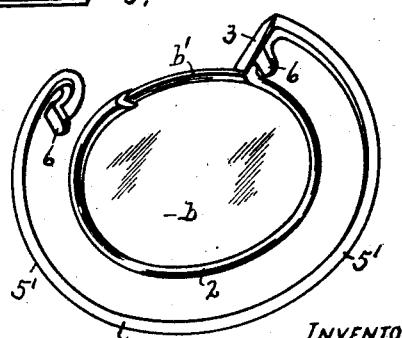
WITNESS
K. L. Meade.
INVENTOR
C. G. Swart
BY
Denison & Thompson
ATTORNEYS

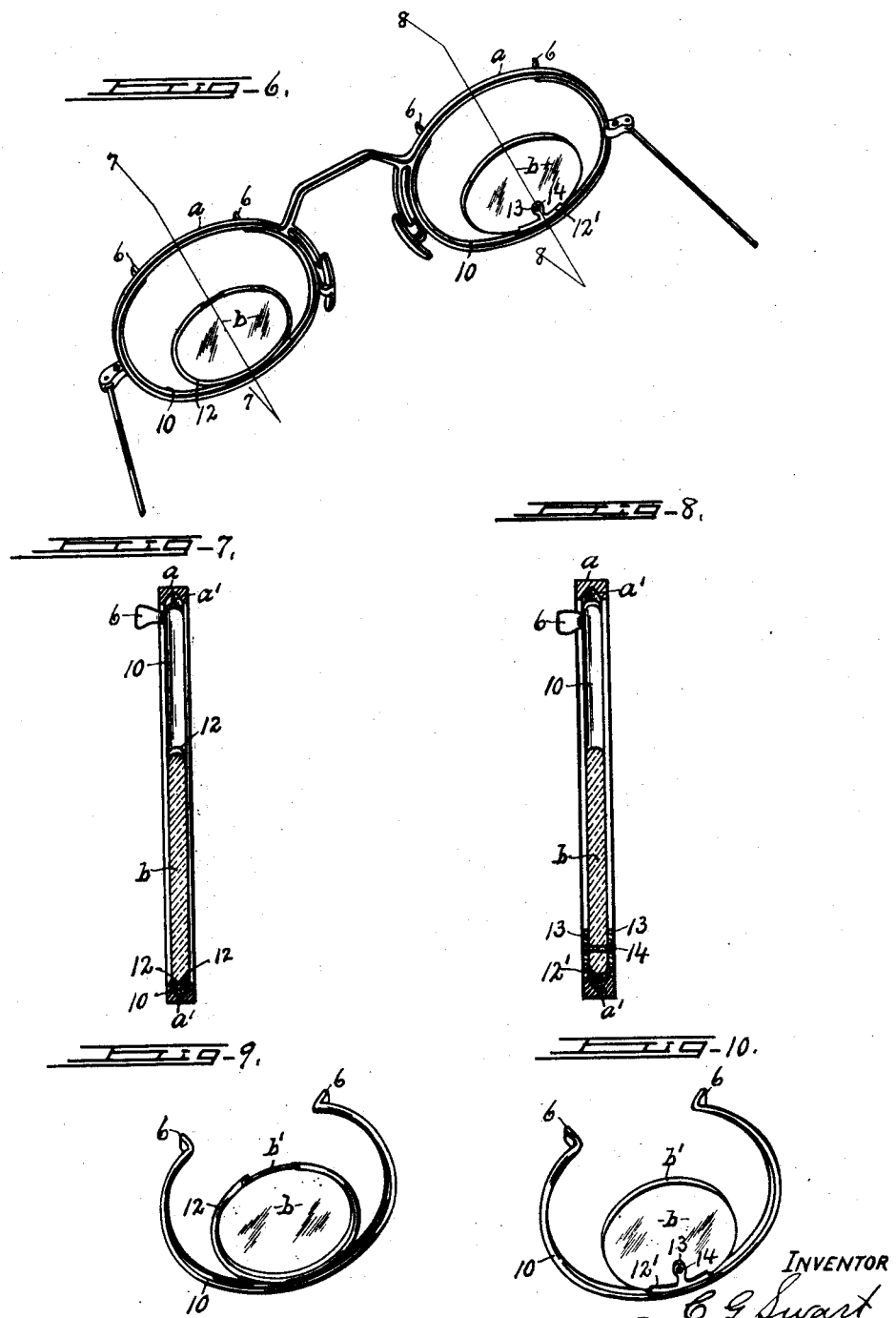

Patented Oct. 25, 1932

1,884,371

UNITED STATES PATENT OFFICE

CHARLES GEORGE SWART, OF AUBURN, NEW YORK

LENS-HOLDER FOR SPECTACLE AND EYEGLASS FRAMES

Application filed October 20, 1930. Serial No. 489,981.

This invention relates to a trial frame for lenses adapted to be used more particularly for temporarily supporting or holding lenses in the rim or rims of selected spectacle or eyeglass frames to enable the purchaser to see by means of a mirror the style and appropriateness of the frame or frames preparatory to purchasing the same.

The main object is to provide a simple and comparatively inexpensive lens-holder which may be easily and quickly inserted into or removed from the rim of the selected frame.

One of the specific objects is to provide the lens-holder with an outer split ring having its ends in sufficiently spaced relation to enable it to be compressed at will radially for insertion into the rim and then allowed to expand under its own tension for frictional retention in the rim.

Another object is to enable the outer ring to be expanded and compressed without in any way affecting the lens-engaging means.

Other objects and uses relating to specific parts of the device will be brought out in the following description.

In the drawings:—

Figure 1 is a face view of a lens frame with slightly modified forms of lens-holding means in opposite rims thereof.

Figures 2 and 3 are enlarged sectional views taken respectively in the planes of lines 2—2 and 3—3, Figure 1.

Figure 4 is a perspective view of the lens-holder shown at the lefthand rim of Figure 1.

Figure 5 is a similar perspective view of the lens-holder shown in the righthand rim, Figure 1.

Figure 6 is a perspective view of a frame showing further modifications of my improved lens-holder.

Figure 7 is an enlarged sectional view taken in the plane of line 7—7, Figure 6.

Figure 8 is an enlarged sectional view taken in the plane of line 8—8, Figure 6.

Figure 9 is a perspective view of the lens-holder shown in the lefthand rim of Figure 6.

Figure 10 is a perspective view of a lens-holder shown in the righthand rim, Figure 6.

The lens-holder shown in the lefthand rim —a— of the frame —A— comprises an outer split rim-engaging ring —1— and an inner split lens-engaging rim —2— which is adapted to receive and retain a lens —b—. Both of these rings are preferably made of bendable spring wire or other more or less resilient material capable of radial compression and expansion, the outer rim being expanded under its own tension after it has been compressed by hand and inserted into the rim, while the inner rim is contractible radially under its own tension for frictionally engaging the periphery of the lens —b— after it has been expanded and the lens inserted therein.

Both rings are preferably formed from a single piece of spring wire having one end bent into circular form of relatively large diameter to form the outer ring —1— while the other end is bent into circular form of lesser diameter to form the inner ring —2— within the outer ring —1—, so that corresponding ends of both rings may be united to each other at a bendable cross section —3— thereof, leaving the other ends of both rings free to be compressed or expanded radially to vary the diameter of the ring as may be required for frames and lenses of different sizes.

The object of the bendable connecting section —3— is to enable the inner ring —2— with the lens —b— therein to be adjusted radially of and within the outer ring to bring the lens into more or less close proximity to the inner face of the outer ring at one side of the center of the outer ring as shown by dotted lines in the righthand ring, Figure 1.

The peripheries of these lenses are usually V-shaped in cross section as shown at —b'—, Figure 2, and the inner peripheries of the rims are usually provided with grooves —a'— of corresponding V-shaped cross section to receive and retain the lenses against inward and outward displacement, and in order that these normal conditions of the lenses and rims may be utilized for the reception of the lens-holder the inner ring —2— is provided with an inner circumferential groove —4— of V-shaped cross section for receiving the periphery of the lens —b—, while the outer ring —1— is provided with an outer circumferential groove —5— of V-shaped cross section adapted to receive one of the inner circumferential flanges —a″— of the rim —a— as shown more clearly in Figure 2.

One of the advantages of forming both rings —1— and —2— from a single piece of wire bent in the manner shown and described is that the circumferential groove in the outer periphery of the outer ring and the similar groove in the inner periphery of the inner ring may be formed in one and the same side of the wire while the latter is in a more or less straightened condition and when bent in the manner shown in Figure 1 brings the groove of the inner ring at the inside thereof for receiving the lens —b— and at the same time brings the groove in the outer ring at the outside for engagement with the inner face of the rim —a—.

It will be noted that the ends of both rings are arranged in sufficiently spaced relation to permit them to be compressed and expanded radially to different diameters as may be required to fit and engage the periphery of the lens —b— and the inner periphery of the rim —a—, the spaces between the ends of both rings being registered with each other at one and the same side, preferably the upper side, of the centers of the rims.

That is, the free end of the inner ring may be expanded outwardly a sufficient distance from its opposite end to permit the free insertion of the lens —b— after which the ring —2— will contract under its own tension to frictionally engage and hold the lens against forward and rearward displacement.

In reverse manner the free end of the outer ring —1— may be compressed inwardly when inserting it into the rim —a— after which it is free to expand radially to frictionally engage the rim and hold both rings against forward and rearward displacement within the rim —a—.

For convenience of manipulation of the outer ring —1— its ends are provided with laterally projecting finger pieces —6— which enables the ring to be easily compressed by hand for insertion into and removal from the rim —a— of the frame —A—.

The lens-holder shown in the righthand rim of Figure 1 and also in Figures 3 and 5, is quite similar to that shown in the lefthand rim of Figure 1, and also in Figures 2 and 4, except that the outer periphery of the outer ring —1— is provided with a rib —5′— of V-shaped cross section to engage in the corresponding inner V-shaped groove —a′— of the adjacent rim —a—.

In the modified lens-holder shown in the lefthand rim of Figure 6 and also in Figures 7 and 9 the outer ring —10— and inner ring —12— are made from separate pieces of spring wire or equivalent resilient material, both rings being split and having their open sides arranged at the upper side of the center of the rim —a—.

The ends of the split ring —10— are arranged in sufficiently spaced relation circumferentially to enable the ring to be compressed or expanded radially for insertion into or removal from the rim in the manner previously described, said ends being offset laterally to form finger pieces —6—.

In this construction the portion of the inner ring —12— opposite its open side is brazed or otherwise permanently secured to the inner face of the corresponding side of the outer ring —10— so that both rings will lie in substantially the same vertical plane corresponding to that of the rim —a—.

The outer ring —10— is concavo-convex in cross section and arranged with its convex side facing outwardly for engagement in the inner groove —a′— of the rim —a—.

The inner ring —12— is also concavo-convex in cross section and arranged with its convex side facing outwardly for engagement in the concave inner side of the lower portion of the outer rim —10— as shown more clearly in Figure 7.

In the lens-holder shown in the righthand rim, Figure 6, the outer ring —10— is similar to that shown in Figures 7 and 8, but the inner rim is replaced by a relatively short segment —12′— which is brazed or otherwise secured to the inner face of the lower side of the rim —a— and is provided with opposite upwardly projecting ears —13— engaging opposite faces of adjacent portions of the lens —b—, which, together with the ears —13—, are provided with registering apertures for receiving a clamping bolt —14—, by which the lens is secured to the segment —12′— for holding the lens in fixed relation to the outer ring —10— midway between the ends thereof.

*Operation*

When placing the lens —b— in the inner ring shown in Figures 1 to 7 inclusive and Figure 9 the ends of the ring are split to permit the insertion of the lens in the inner groove thereof, after which the inner ring contracts under its own tension against the periphery of the lens to hold the latter against forward and rearward displacement therefrom.

When the lens is once inserted in the holder as described, the rims with the holder —1— may be marked to identify the index or other characteristic of the lens.

When inserting the lens-holder into one of the rims of the frame it is compressed radially by hand through engagement with the finger pieces —6— and then placed into the corresponding rim and allowed to expand under its own tension into engagement with said rim to hold it against accidental forward or rearward displacement, the operation being reversed for removing the holder from the rim.

What I claim is:—

1. A trial frame for lenses and lens rims comprising an outer split ring adapted to be inserted into a lens rim, and an inner split ring adapted to receive a lens, said rings being united at one end and their opposite ends free to move toward and from the united ends.

2. A trial frame for lenses and lens rims comprising outer and inner split rings of resilient material adapted to engage respectively the inner edge of a rim and the peripheral edge of a lens, each ring having one end united to the corresponding end of the other ring and its opposite end free to move toward and from the united ends.

3. A trial frame for lenses and lens rims comprising an outer split ring adapted to be inserted into a lens rim, and an inner split ring adapted to receive a lens, said rings being united at one end and their opposite ends free to move toward and from the united ends, the normal radius of the outer ring being greater than the inner radius of the rim which it is adapted to receive to frictionally hold the ring in the rim when inserted therein.

4. A trial frame for lenses and lens rims comprising an outer split ring adapted to be inserted into a lens rim, and an inner split ring adapted to receive a lens, said rings being united at one end and their opposite ends free to move toward and from the united ends, the united ends of the outer and inner rings and the free end of the outer ring being provided with finger pieces by which the outer ring may be compressed radially for insertion into a rim.

In witness whereof I have hereunto set my hand this eighth day of October, 1930.

CHARLES GEORGE SWART.